US010100242B2

(12) United States Patent
Bourbiaux et al.

(10) Patent No.: US 10,100,242 B2
(45) Date of Patent: Oct. 16, 2018

(54) ENHANCED HYDROCARBON RECOVERY METHOD COMPRISING OPTIMIZING THE INJECTION OF AN AQUEOUS CONDITIONING SOLUTION

(75) Inventors: Bernard Bourbiaux, Rueil-Malmaison (FR); Quang Long Nguyen, Puteaux (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 323 days.

(21) Appl. No.: 13/994,155

(22) PCT Filed: Nov. 24, 2011

(86) PCT No.: PCT/FR2011/000621
§ 371 (c)(1),
(2), (4) Date: Aug. 7, 2013

(87) PCT Pub. No.: WO2012/080590
PCT Pub. Date: Jun. 21, 2012

(65) Prior Publication Data
US 2013/0312971 A1  Nov. 28, 2013

(30) Foreign Application Priority Data

Dec. 15, 2010  (FR) ...................... 10 04889

(51) Int. Cl.
*E21B 43/16* (2006.01)
*C09K 8/58* (2006.01)

(52) U.S. Cl.
CPC ............... *C09K 8/58* (2013.01); *E21B 43/16* (2013.01)

(58) Field of Classification Search
CPC ................................. C09K 8/58; E21B 43/16
USPC .................... 166/307, 305.1, 250.03; 703/10
See application file for complete search history.

(56) References Cited

U.S. PATENT DOCUMENTS 3,871,452 A    3/1975  Sarem
3,977,470 A    8/1976  Chang
2005/0199395 A1    9/2005  Berger

OTHER PUBLICATIONS

Bazin et al., Ion Exchange and Dissolution/Precipitation Modeling: Application to the Injection of Aqueous Fluids Into a Reservoir Sandstone, SPE Reservoir Engineering, vol. 6, No. 2, May 1991, pp. 233-238.
International Search Report of Appln. No. PCT/FR2011/000621 dated Apr. 2, 2012 with partial English translation.

*Primary Examiner* — Silvana C Runyan
(74) *Attorney, Agent, or Firm* — Fitch, Even, Tabin & Flannery, LLP

(57) ABSTRACT

The present invention relates to a method for enhanced hydrocarbon recovery in an underground reservoir rock comprising injecting an aqueous conditioning solution containing an alkaline agent, wherein the in-situ effects of the injection are determined by means of a flow simulation on a reservoir model discretized in cells, by taking into account the transport of the alkaline agent and without taking into account the transport of species referred to as intermediate species that result from the injection of the principal agent in aqueous solution, the intermediate species concentrations being determined analytically in each cell.

13 Claims, 1 Drawing Sheet

Figure 1:
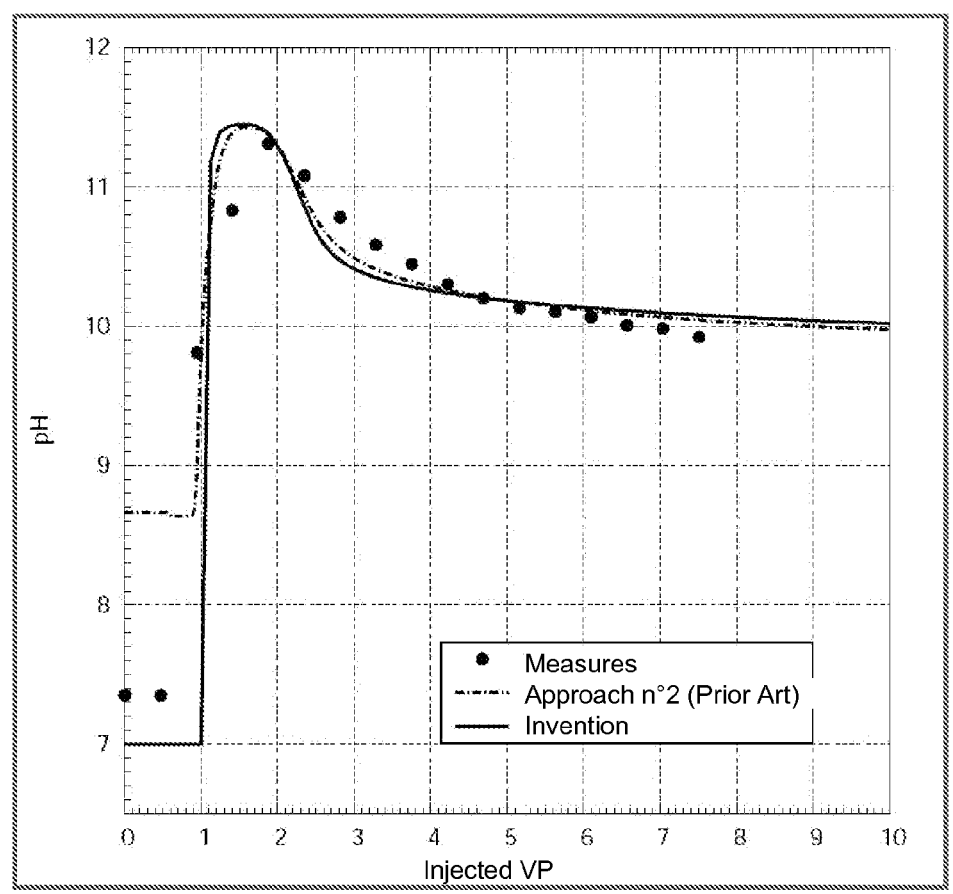

ENHANCED HYDROCARBON RECOVERY METHOD COMPRISING OPTIMIZING THE INJECTION OF AN AQUEOUS CONDITIONING SOLUTION

FIELD OF THE INVENTION

The field of the present invention relates to the enhanced recovery of hydrocarbons in reservoir rocks, by means of medium sweep techniques using aqueous solutions comprising chemical products.

BACKGROUND OF THE INVENTION

The recovery of oil from oil fields often requires injection of a displacing fluid, most often water, to maintain the pressure in the reservoir so as to allow production, through displacement of the oil in place, from injection wells to production wells arranged according to a previously optimized scheme for the field considered.

In the case of water injection, this displacing fluid can be injected alone or it can, on the contrary, contain chemical agents intended to improve sweeping of the oil in place.

Among these chemical agents, on the one hand, surfactants are intended to reduce trapping of the oil in the pores of the rock through reduction of the water-oil interfacial tension and possibly modification of the rock wettability; on the other hand, polymers provide higher viscosity to the water, thus increasing its hydrocarbon phase sweep efficiency.

However, these two categories of enhancing products undergo losses in the reservoir due to many phenomena, among which retention or adsorption of the products on the rock, which can be high and obviously detrimental to the economic interest of such recovery methods. The presence of divalent cations in place in the reservoir water and on the rock minerals (notably clays) still increases these losses.

The injection of other agents, generally alkaline products (such as sodium carbonate, soda, etc.) is therefore recommended prior to injecting aqueous sweeping fluids containing enhancing products such as surfactants and polymers. These rock conditioning agents, dissolved in various chemical forms, dissociated or not into ions, involve many chemical equilibria in aqueous phase:
  salt precipitation reactions (divalent cation salts in place notably),
  multiple interactions with the rock (ion exchange and adsorption with modification of the charges of the solid surface),
  possibly also reactions with some constituents of the oil in place (formation of soaps with the surfactant). The injection of a conditioning agent alone can even already improve the recovery of oil in relation to the conventional injection of water without any chemical agent.

All these physico-chemical phenomena have to be taken into account in order to determine the volumes and concentrations of the products to be injected, and the modes of injection (flow rates, distribution in the field via the injection scheme, etc.), for the phase of conditioning the reservoir rock (injection of alkaline conditioning agents) as well as, subsequently, the enhanced water slugs (through surfactants and/or polymers), intended to improve the recovery and the displacement efficiency.

This dimensioning of the injected solutions is essential because it determines the feasibility and the profitability of these methods, via:

(a) the size and the cost of the facilities: surface facilities for preparing the solutions (surfactants, polymers); number, arrangement and well pumping equipments, (b) the conditioning product and enhancer masses required (volumes and concentrations), therefore their cost, (c) and, of course, the efficiency in terms of oil recovery.

Dimensioning these conditioning product and enhancer injections involves computations on a reservoir model discretized in form of elementary units of volume (cells), wherein the fluxes of the phases in presence (water and hydrocarbon phases: oil and/or gas), the transport and the evolution of the chemical species (bringing into or keeping in solution, precipitation, adsorption, conversion to other chemical species) have to be calculated so as to determine the amounts of product lost within the reservoir and the oil recovered in the production wells. This dimensioning involves studying the sensitivity to the multiple operating parameters (concentrations, slug size, flow rates, well placement, etc.), which therefore requires a reliable, powerful (fast) and efficient (in terms of usability of the results) simulator.

Reliability implies taking account of the various physico-chemical mechanisms involved. Power means short simulation times so as to be able to simulate multiple scenarios intended to understand and to select a dimensioning that guarantees the feasibility and maximizes the profitability of the operation.

Finally, the simulator efficiency means here a prediction tool requiring known information in a number of data as limited as possible by the user, and whose results interpretation and optimization is easy and fast via sensitivity studies with a small number of input parameters.

Considering the complex mode of action of the aforementioned products, the prediction models are complex because they usually include the multiple chemical species involved in the equilibrium reactions within the aqueous phase, such as: water-oil equilibrium, reactions of precipitation, adsorption on the rock, or others.

Taking into account all the chemical species and all the phenomena involved in the transport of the enhancing and conditioning products on the reservoir scale considerably increases the size of the numerical systems to be solved and therefore the computation time.

SUMMARY OF THE INVENTION

The present invention thus relates to a method for enhanced hydrocarbon recovery in an underground reservoir rock comprising injecting an aqueous conditioning solution containing an alkaline agent, wherein the following stages are carried out:
  determining the in-situ effects of said injection by means of a flow simulation on a reservoir model discretized in cells, said simulation taking into account the transport from cell to cell of the alkaline agent as the principal agent and without taking account of the transport from cell to cell of species referred to as intermediate species that result from the injection of the principal agent in aqueous solution, the concentrations of said intermediate species being determined analytically in each cell,
  deducing from said simulation the injection conditions and the physicochemical characteristics of said aqueous conditioning solution.

The evolution of the pH value in each cell can be deduced from the alkaline solution injection simulation.

The alkaline agent loss in the reservoir rock can be deduced.

The alkaline agent can be $Na_2CO_3$.

DETAILED DESCRIPTION

The object of the invention is to overcome the heavy drawback linked with the complexity of the numerical injection dimensioning models by maintaining the reliability, by improving the ease of implementation through a limited parametrization (i.e. minimum information to be known by the user) and by allowing easier interpretation of results obtained more rapidly. In order to illustrate the present invention, we consider hereafter the injection of sodium carbonate ($Na_2CO_3$), which is the alkaline agent conventionally used for alkaline solution injection. To simplify the illustration of the advantages of the present invention, we consider the simulation of the injection, into a reservoir, of a solution of this alkaline agent $Na_2CO_3$ in the absence of any other salt.

The implementation of the present invention comprises the stages that consist, at each time step of the simulation of such a displacement, in:

1. modelling the transport from cell to cell of the only chemical additive(s) of the injection water, in the present case carbonate $Na_2CO_3$, referred to as the "principal" species, without taking into account the transport of the chemical species referred to as "intermediate" species resulting from the multiple equilibria obtained by bringing this "principal" agent into aqueous solution, i.e., in the present case, $HCO_3^-$, $CO_3^{2-}$, $H_2CO_3$, $Na^+$, $H^+$ and $OH^-$;

2. determining locally, in each reservoir cell, and directly through analytical means, the concentrations of the multiple species in aqueous phase resulting from dissociation, adsorption on the rock, and possibly precipitation (in the presence of divalent cations in place notably) and/or reaction equilibria. This determination allows to deduce the effects of the chemical agent, notably the pH modification and the surface condition (wettability) of the rock in the case of an alkaline agent. The analytical solution advantageously guarantees that solutions are obtained rapidly in comparison with the conventional iterative numerical methods such as, for example, Newton's method.

The concentrations values relative to the chemical species in solution resulting from the transport of the alkaline agent between the cells and the various local equilibria in each cell allow to update:

the phase properties, notably pH value, interfacial tension, viscosity, the displacement parameters, for example by means of relative permeability curves as a function of the capillary number, these data being required for precise and reliable solution of the transport fluxes from cell to cell.

In order to clearly illustrate the advantages of the present invention in relation to the existing know-how, we compare hereafter, by way of non-limitative example, the injection of a $Na_2CO_3$ aqueous solution as the "principal" conditioning agent and in the absence of any other salt. We also compare the approach and the solution methods according to the present invention with those implemented in the prior art. It can be noted that the effects of this agent (carbonate) result from the dissociation of the $CO_3^{2-}$ carbonate ions to $HCO_3^-$ ions and $OH^-$ ions, the latter having the effect of modifying the pH of the aqueous solution and the surface condition of the rock due to their adsorption by the rock.

Approach No.1 defines 2 species, the $Na^+$ and $OH^-$ ions, to the exclusion of any other principal or secondary species. This approach is predictive of the pH evolution of the solutions produced by the production wells only in the case of soda injection, and not in the case of sodium carbonate injection.

In fact, it is not possible to consider that the injection of a sodium carbonate concentration in aqueous phase is equivalent to the injection of the $OH^-$ ions obtained after bringing this carbonate into solution, because the $CO_3^{2-}$ carbonate ions are not totally dissociated into $OH^-$ and $HCO_3^-$ ions, they rather dissociate as they progress in the reservoir due to the equilibrium displacement ($CO_3^{2-}$+$H_2O$-->$HCO_3^-$+$OH^-$) caused by the adsorption of the $OH^-$ ions by the reservoir rock. This behavior is referred to as "buffer" effect.

Approach No.2 is notably described in the SPE Reservoir Engineering issue of May 1991 by B. Bazin and J. Labrid: "*Ion Exchange and Dissolution/Precipitation Modeling: Application to the Injection of Aqueous Fluids Into a Reservoir Sandstone*", pages 233-238. This approach takes account of the displacement from cell to cell that involves other chemical species (monovalent and divalent salts other than those coming from sodium carbonate). This approach No.2 is predictive, but complex and cumbersome insofar as the method is iterative.

Indeed, the two advantages of the present invention in relation to this approach No.2 appear in lines A and B of the table below.

| | Approach No. 1 | Approach No. 2 | Present invention |
|---|---|---|---|
| Input data relative to the solution injected | $Na^+$ and $OH^-$ concentrations | $Na^+$ and $CO_3^{2-}$ concentrations | $Na_2CO_3$ concentration equal in moles to that of $CO_3^{2-}$ carbonate, which is the active species |
| A. Principal species transported in aqueous phase | $Na^+$, $OH^-$ | $Na^+$, total carbon C ($C=H_2CO_3 + HCO_3^- + CO_3^{2-}$) | $Na_2CO_3$ |
| Local equilibria within each cell allowing to calculate the secondary species concentrations, the resulting pH, and the concentrations of the principal species transported in aqueous phase | $OH^-$ adsorption equilibrium: $OH^-_{solution}$<-->$OH^-_{rock}$ | (1) $H_2O$ <--> $H^+$ + $OH^-$<br>(2) $CO_3^{2-}$ + $H_2O$ <--> $HCO_3^-$ + $OH^-$<br>(3) $HCO_3^-$ + $H_2O$ <--> $H_2CO_3$ + $OH^-$ (equilibrium not considered within the context of the present invention)<br>(4) $OH^-$ adsorption equilibrium: $OH^-_{solution}$<--> $OH^-_{rock}$ | |

| | Approach No. 1 | Approach No. 2 | Present invention |
|---|---|---|---|
| B. Mode of (local) solution of the (principal and secondary) species equilibria of the aqueous solution within each cell | Analytical solution of the adsorption equilibrium only | Iterative solution of the $CO_3^{2-}$, $HCO_3^-$, $H_2CO_3$, $OH^-_{rock}$ and $OH^-_{solution}$ concentrations (from which the pH value is deduced) | Direct analytical solution of (1), (2) and (4) ($H_2CO_3$ being negligible in a basic medium) giving access to the pH and to the concentration of the principal species $Na_2CO_3$ in aqueous solution | line A of the table indicates that the number of principal species transported by simulation is limited to the necessary minimum (only one in the example considered) in the model object of the present invention, i.e. only the conditioning additive(s), without taking account of the species generated in aqueous solution. The size of the numerical transport model to be solved is thus reduced. Therefore, in the present example, for each cell of the reservoir model, the concentration balances of the chemical species in aqueous phase should be written only for one principal species instead of 2;

line B of the table indicates that the equilibria solution within each cell, intended to determine notably the effects of the principal additive, the reduction of the adsorbing power of the rock through adsorption of the secondary chemical species $OH^-$, is carried out using a direct analytical method within the scope of the present invention, instead of an iterative method within the scope of approach No.2, which is an advantage in terms of robustness and a guarantee for obtaining the solutions. Considering these advantages, the use of the analytical method is adopted, including all the cases where its use requires approximations in the equilibria processing, and the absence of significant impact of said approximations on the predictions is controlled separately (according to the state of the art), which is for example the case here for the hypothesis of absence of the chemical species $H_2CO_3$, totally permitted considering the basic character of the solutions in presence, which prevents dissociation of the species $HCO_3^-$.

It can be noted that the present invention can be implemented without any significant loss of precision in the quality of the results obtained. Thus, for the example described above, two simulators operating according to the present invention and to approach No.2 of the prior art predict quasi-identical pH value evolutions, i.e. whose order of magnitude of the differences (of the order of 0.1 unit pH maximum) is smaller than the differences (considered acceptable by the person skilled in the art) between the predictions of the models and the real observations from laboratory experiments.

FIG. 1 illustrates these results. It relates to the pH evolution at the outlet of a (carbonate-free) water-saturated laboratory core sample during the injection of one pore volume (VP) of an aqueous sodium carbonate solution at a concentration of 10 g/l, followed by the injection of a high volume of flush water.

The pH value of the solution (effluent) at the core outlet was measured at regular intervals throughout the injection (about 8 pore volumes VP). The dots in FIG. 1 represent the measurements. This experiment was simulated according to approach No.2 on the one hand (represented in FIG. 1 by a dot-and-dash line) and according to the method of the present invention on the other hand (represented in FIG. 1 by a full line). The goal of the simulation is to reproduce the pH evolution of the effluent measured after breakthrough of the solution injected, said breakthrough being obtained after injecting about 1 pore volume VP. FIG. 1 shows that the pH response curve simulated by means of the method according to the present invention is quasi-superimposed on the response curve simulated using approach No.2. Furthermore, the difference between the two simulated curves is much smaller than the difference (considered acceptable) between any one of these curves and the measured data.

Another example is described hereafter in order to show the application of the invention to more complex situations.

It consists in injecting an alkaline agent into a reservoir whose water in place contains divalent calcium and magnesium cations (in form of chlorides for example) that precipitate in the presence of carbonate. During an alkaline injection, calcium carbonate and magnesium carbonate precipitate in the pores of the rock. By disregarding the effects of cation exchanges between the rock and the solution, the injection of $Na_2CO_3$ then involves the following equilibria:

$$H_2O \longleftrightarrow H^+ + OH^- \quad (1)$$

$$CO_3^{2-} + H_2O \longleftrightarrow HCO_3^- + OH^- \quad (2)$$

$$HCO_3^- + H_2O \longleftrightarrow H_2CO_3 + OH^- \quad (3)$$

$$OH^- \text{ adsorption equilibrium: } OH^-\text{solution} \longleftrightarrow OH^-\text{rock} \quad (4)$$

$$Ca^{++} + CO_3^{2-} \longleftrightarrow CaCO_3(s) \quad (5)$$

$$Mg^{++} + CO_3^{2-} \longleftrightarrow MgCO_3(s) \quad (6)$$

where $CaCO_3(s)$ and $MgCO_3(s)$ represent the precipitated calcium and magnesium carbonates (solids).

It is reminded that equilibrium (3) is almost entirely displaced to the left in a basic medium, which is the case with an alkaline injection of sodium (or soda) carbonate. 5 equilibria then remain, which involve the nine (9) species $H^+$, $OH^-$solution ($OH^-$ in solution), $OH^-$rock ($OH^-$ adsorbed), $CO_3^{2-}$, $HCO_3^-$, $Ca++$, $CaCO_3(s)$, $Mg^{++}$ and $MgCO_3(s)$ connected by the following seven (7) relations:

the equations of the previous 4 equilibria in aqueous solution:

$$k1 = [H^+][OH^-]$$

$$k2 = \frac{[HCO_3^-][OH^-]}{[CO_3^{2-}]}$$

$$ks3 = [Ca^{2+}][CO_3^{2-}]$$

$$ks4 = [Mg^{2+}][CO_3^{2-}]$$

an adsorption equilibrium for the OH⁻ ions distributed among the aqueous solution and the solid surface of the rock according to an adsorption isotherm of the form as follows:

$$q_{ads} = q_{max} \frac{b \cdot [OH^-]}{1 + b \cdot [OH^-]},$$

where $q_{ads}$, and $q_{max}$ represent the mass fractions adsorbed and adsorbable on the rock, [OH⁻] the concentration of OH⁻ in aqueous solution, b a characteristic constant, an electroneutrality equation for the aqueous solution, and finally a species conservation equation: all of the carbon in solution coming from the carbonate of the injected solution.

In a first approach, the problem thus comprises two degrees of freedom (9 minus 7).

Two strategies are possible to solve this problem:

1. According to the prior art, at least 2 species are transported and the concentrations of the other species, notably the OH⁻ ions in solution adsorbed by the solid, are determined locally in each cell using an iterative method.

2. According to the present invention, only one principal species is transported, the chemical agent (carbonate) in solution. Locally, in each cell, the concentrations of the OH⁻ ions in solution adsorbed by the solid are determined by direct analytical solution of the previous equations. Such a calculation is possible because the precipitations of the divalent ions in place only subtract the injected agent (carbonate) as it reaches the cells.

The invention claimed is:

1. A method for enhanced hydrocarbon recovery in an underground reservoir rock, comprising:
   conducting a flow simulation on a reservoir model to determine in-situ effects of an injection of an aqueous conditioning solution containing an alkaline agent into the underground reservoir rock, said in-situ effects comprising pH value, interfacial tension, viscosity, and displacement parameters,
   said flow simulation comprising modelling displacement of the alkaline agent as a principal agent through the underground reservoir rock using the reservoir model, without modelling displacement of species referred to as intermediate species that would result from injection of the principal agent in aqueous solution through the underground reservoir rock using the reservoir model;
   analytically determining concentrations of said intermediate species;
   deducing, from said flow simulation and from analytically determining concentrations of said intermediate species, injection conditions comprising volume and concentration of materials for an enhanced aqueous conditioning solution containing an alkaline agent and modes of injection and physico-chemical characteristics of the enhanced aqueous conditioning solution; and then forming the enhanced aqueous conditioning solution; and then
   injecting into the underground reservoir rock the enhanced aqueous conditioning solution to provide enhanced hydrocarbon recovery from the underground reservoir rock.

2. The method as claimed in claim 1, wherein an evolution of a pH value in each cell is deduced from the flow simulation.

3. The method as claimed in claim 2, wherein alkaline agent loss in the underground reservoir rock is deduced.

4. The method as claimed in claim 1, wherein the alkaline agent comprises $Na_2CO_3$.

5. The method as claimed in claim 1, further comprising, after injecting the aqueous conditioning solution into the underground reservoir rock, injecting into the underground reservoir rock a displacing fluid to provide enhanced hydrocarbon recovery from the underground reservoir rock.

6. The method as claimed in claim 5, wherein the displacing fluid includes at least one of a surfactant configured to reduce trapping of oil in the pores of the underground reservoir rock and a polymer configured to provide a higher viscosity to the displacing fluid to increase hydrocarbon phase sweep efficiency of the displacing fluid.

7. The method as claimed in claim 1, wherein the alkaline agent is $Na_2CO_3$, and wherein said flow simulation comprises modelling transport of $Na_2CO_3$ as a principal agent through the reservoir model, without modelling transport of intermediate species $HCO_3^-$, $CO_3^{2-}$, $H_2CO_3$, $Na^+$, $H^+$ and $OH^-$ through the reservoir model.

8. A method for enhanced hydrocarbon recovery in an underground reservoir rock, comprising:
   conducting a flow simulation on a reservoir model discretized in a form of elementary units of volume to determine in-situ effects of an injection of an aqueous conditioning solution containing an alkaline agent into the underground reservoir rock, said in-situ effects comprising pH value, interfacial tension, viscosity, and displacement parameters,
   said flow simulation comprising modelling displacement through the underground reservoir rock using the elementary units of volume of the reservoir model of only the alkaline agent as a principal agent;
   analytically determining concentrations of intermediate species that would result from injection of the principal agent in aqueous solution through the underground reservoir rock using the reservoir model;
   deducing, from said flow simulation and from analytically determining concentrations of said intermediate species, injection conditions comprising volume and concentration of materials for an enhanced aqueous conditioning solution containing an alkaline agent and modes of injection and physico-chemical characteristics of said the enhanced aqueous conditioning solution; and then
   injecting into the underground reservoir rock the enhanced aqueous conditioning solution to provide enhanced hydrocarbon recovery from the underground reservoir rock.

9. The method as claimed in claim 8, wherein an evolution of a pH value in each cell is deduced from the flow simulation.

10. The method as claimed in claim 9, wherein alkaline agent loss in the underground reservoir rock is deduced.

11. The method as claimed in claim 8, wherein the alkaline agent comprises $Na_2CO_3$.

12. The method as claimed in claim 8, further comprising, after injecting the aqueous conditioning solution into the underground reservoir rock, injecting into the underground reservoir rock a displacing fluid to provide enhanced hydrocarbon recovery from the underground reservoir rock.

13. The method as claimed in claim 12, wherein the displacing fluid includes at least one of a surfactant configured to reduce trapping of oil in the pores of the underground reservoir rock and a polymer configured to provide a higher viscosity to the displacing fluid to increase hydrocarbon phase sweep efficiency of the displacing fluid.

* * * * *